(12) United States Patent
Morioka

(10) Patent No.: US 10,827,086 B2
(45) Date of Patent: Nov. 3, 2020

(54) DOCUMENT READING DEVICE, IMAGE FORMING APPARATUS, AND GUIDANCE NOTIFICATION METHOD

(71) Applicant: SHARP KABUSHIKI KAISHA, Sakai (JP)

(72) Inventor: Hirohito Morioka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/409,702

(22) Filed: May 10, 2019

(65) Prior Publication Data

US 2019/0356796 A1    Nov. 21, 2019

(30) Foreign Application Priority Data

May 18, 2018 (JP) .................................. 2018-096305

(51) Int. Cl.
  *H04N 1/00*     (2006.01)
(52) U.S. Cl.
  CPC ..... *H04N 1/00477* (2013.01); *H04N 1/00411* (2013.01); *H04N 1/00488* (2013.01); *H04N 1/00811* (2013.01)
(58) Field of Classification Search
  CPC ............. H04N 1/0022; H04N 1/33369; H04N 1/00482; H04N 1/32037; H04N 1/4433; H04N 2201/0094
  USPC ................................................ 358/1.14, 1.13
  See application file for complete search history.

(56) References Cited

U.S. PATENT DOCUMENTS 5,157,518 A * 10/1992 Ohtaki ............... H04N 1/40056
                                                         358/443
9,531,707 B1 * 12/2016 Daniel ................ H04L 63/0861

FOREIGN PATENT DOCUMENTS

JP          2005-004039 A     1/2005

* cited by examiner

*Primary Examiner* — Tammy Paige Goddard
*Assistant Examiner* — Darryl V Dottin
(74) *Attorney, Agent, or Firm* — ScienBiziP, P.C.

(57) ABSTRACT

A document reading device that is capable of selectively designating a document reading process includes a sound output unit that gives notification of information needed for a document reading process that has been selected and a notification control unit that controls output from the sound output unit. When a specific document reading process has been selected, the notification control unit exercises control so that in a case where a device state of the document reading device is not the specific device state, notification information that prompts for the specific device state is outputted by the sound output unit after a predetermined period of time has elapsed since the specific document reading process was selected and so that in a case where the device state of the document reading device is the specific device state, notification information whose content prompts for the specific device state is not outputted by the sound output unit.

12 Claims, 7 Drawing Sheets

FIG. 5

| PATTERN | STATES THAT PRECEDE TURNING ON OF CROPPING FUNCTION | | OPERATIONS THAT FOLLOW TURNING ON OF CROPPING FUNCTION | | | EXECUTION ENABLED / DISABLED | REMARKS |
|---|---|---|---|---|---|---|---|
| | DOCUMENT COVER | PRESENCE OR ABSENCE OF DOCUMENT | STEP 1 | STEP 2 | STEP 3 | | |
| 1 | CLOSED | UNKNOWN | OPEN COVER IMMEDIATELY | PLACE DOCUMENT | KEEP COVER OPEN | ENABLED | |
| 2 | CLOSED | UNKNOWN | OPEN COVER IMMEDIATELY | PLACE DOCUMENT | CLOSE COVER | DISABLED | OBVIOUSLY OPERATING ERROR |
| 3 | CLOSED | UNKNOWN | DO NOT OPEN COVER IMMEDIATELY | | | DISABLED | HIGH POSSIBILITY OF DOCUMENT HAVING BEEN ALREADY PLACED, AND RISK OF OPERATING ERROR |
| 4 | CLOSED | ALREADY DETECTED | OPEN COVER IMMEDIATELY | | | ENABLED | |
| 5 | CLOSED | ALREADY DETECTED | DO NOT OPEN COVER IMMEDIATELY | | | DISABLED | HIGH POSSIBILITY OF OPERATING ERROR |
| 6 | OPEN | ALREADY DETECTED | KEEP COVER OPEN | | | ENABLED | |
| 7 | OPEN | ALREADY DETECTED | CLOSE COVER | | | DISABLED | OBVIOUSLY OPERATING ERROR |
| 8 | OPEN | YET TO BE DETECTED | PLACE DOCUMENT | KEEP COVER OPEN | | ENABLED | |
| 9 | OPEN | YET TO BE DETECTED | PLACE DOCUMENT | CLOSE COVER | | DISABLED | OBVIOUSLY OPERATING ERROR |

DOCUMENT READING DEVICE, IMAGE FORMING APPARATUS, AND GUIDANCE NOTIFICATION METHOD

BACKGROUND

1. Field

The present disclosure relates to document reading devices and the like and, in particular, to a document reading device and the like that make it possible to selectively designate a document reading process.

2. Description of the Related Art

There have recently been known a document reading device, an image forming apparatus including the same, and the like that, by displaying guidance such as an operation procedure in reading a document, prevent a user from making a mistake in operation.

As a conventional technology, for example, an image forming apparatus has been disclosed which, in a case where an image forming operation mode that functions under a specific mechanical state has been selected and in a case where a machine condition of the image forming apparatus is not the specific mechanical state, causes a display unit to show display information whose content prompts for the specific mechanical state and which, in a case where the machine condition of the image forming apparatus is the specific mechanical state, causes the display unit to show display information whose content prompts for maintaining the specific mechanical state (see Japanese Unexamined Patent Application Publication No. 2005-4039).

This configuration allows the image forming apparatus to improve its operability by preventing an unversed user from bringing the image forming apparatus into a state other than the specific mechanical state regarding the image forming operation mode that functions under the specific mechanical state.

The technology proposed in Japanese Unexamined Patent Application Publication No. 2005-4039 is configured to, in a case where the mechanical state of the image forming apparatus is not the specific mechanical state, perform a display that prompts for the specific mechanical state. However, for example, if guidance for performing a regular operation is executed when a user who has understood the specifications correctly is about to perform the regular operation, it is meddlesome and cumbersome to the user.

Further, there has recently been known a so-called multiple cropping technology with which to, in a case where a plurality of documents have been placed on a document platen of a document reading device, automatically detect the positions and sizes of the plurality of documents placed on the document platen and cut out each document.

Image reading that involves the use of a multiple cropping function includes, for example, document reading that is performed with a document cover in an open state, unlike document reading that is performed with the document cover closed as is the case with a normal copy operation. Thus, it has been known that in a case where states in which documents are read vary according to functions of reading the documents, an operation mistake is prevented by performing sound guidance that prompts for opening the document cover in performing an operation of reading the documents.

However, unconditionally executing the sound guidance in performing the operation of reading the documents causes such a problem that if the sound guidance is executed when a user who has understood the specifications correctly is about to open the document cover, it is meddlesome and cumbersome to the user.

To address this problem, there has been a demand for a document reading device configured such that according to the status of an operation of performing document reading, the execution of guidance is appropriately performed in a case where a user does not understand an operation of reading documents, a case where a user has temporarily forgotten the operation, or other cases.

t is desirable to provide a document reading device and the like that make it possible to execute highly useful guidance without a feeling of cumbersomeness in a user by performing appropriate guidance according to the status of an operation of performing document reading with the document reading device.

SUMMARY

According to an aspect of the disclosure, there is provided document reading device that is capable of selectively designating a document reading process, the document reading device including: a notification unit (e.g. output of sound or image display) that gives notification of information needed for a document reading process that has been selected; and a notification control unit that controls output from the notification unit, wherein when a specific document reading process (e.g. a multiple cropping function) that functions under a specific device state (e.g. when a document cover is in an open state) has been selected, the notification control unit exercises control so that in a case where a device state of the document reading device is not the specific device state (e.g. a case where the document cover is closed), notification information that prompts for the specific device state (e.g. bringing the document cover into an open state) is outputted by the notification unit after a predetermined period of time has elapsed since the specific document reading process was selected and so that in a case where the device state of the document reading device is the specific device state, notification information whose content prompts for the specific device state is not outputted by the notification unit.

According to an aspect of the disclosure, there is provided an image forming apparatus, including a document reading device that is capable of selectively designating a document reading device, which is capable of forming an image, the image forming apparatus including, as the document reading device, a document reading device including: a notification unit that gives notification of information needed for a document reading process that has been selected; and a notification control unit that controls output from the notification unit, wherein when a specific document reading process that functions under a specific device state has been selected, the notification control unit exercises control so that in a case where a device state of the document reading device is not the specific device state, notification information that prompts for the specific device state is outputted by the notification unit after a predetermined period of time has elapsed since the specific document reading process was selected and so that in a case where the device state of the document reading device is the specific device state, notification information whose content prompts for the specific device state is not outputted by the notification unit.

According to an aspect of the disclosure, there is provided a method for giving notification of guidance about a document reading device that is capable of selectively designating a document reading process, the method including: giving notification of information needed for a document reading process that has been selected; controlling the notification of the information; and when a specific document reading process that functions under a specific device state has been selected, exercising control so that in a case where a device state of the document reading device is not the specific device state, notification of notification information that prompts for the specific device state is given after a predetermined period of time has elapsed since the specific document reading process was selected and so that in a case where the device state of the document reading device is the specific device state, notification of notification information whose content prompts for the specific device state is not given.

BRIEF DESCRIPTION OF THE DRAWINGS

FIG. 5 is an operation pattern classification table that classifies patterns of user operation on the document reading device;

DESCRIPTION OF THE EMBODIMENTS

First Embodiment

The following describes a first embodiment of the present disclosure with reference to the drawings.

Figure 1:
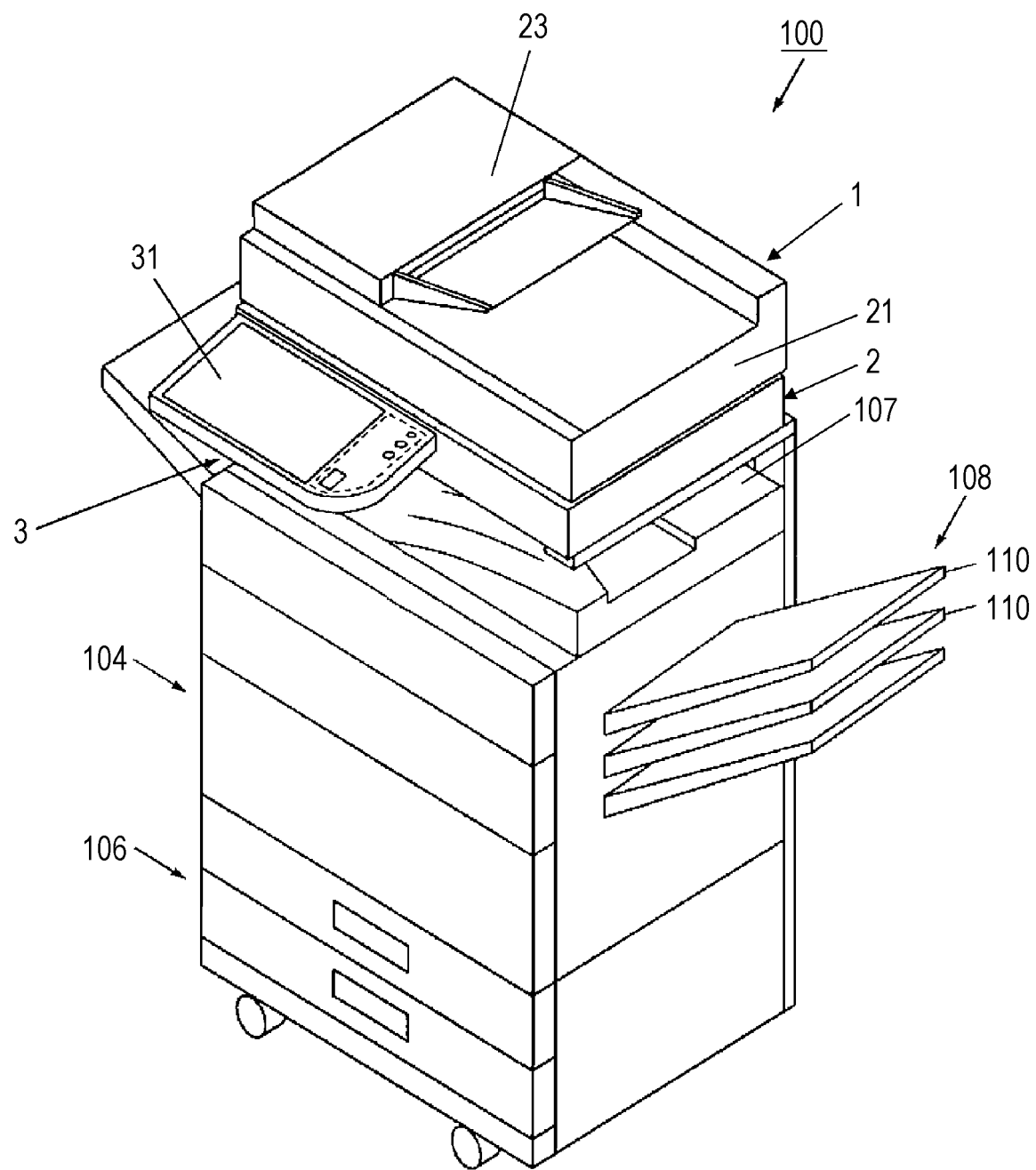
FIG. 1 is an explanatory diagram showing an overall configuration of an image forming apparatus including a document reading device according to a first embodiment.
Figure 2:
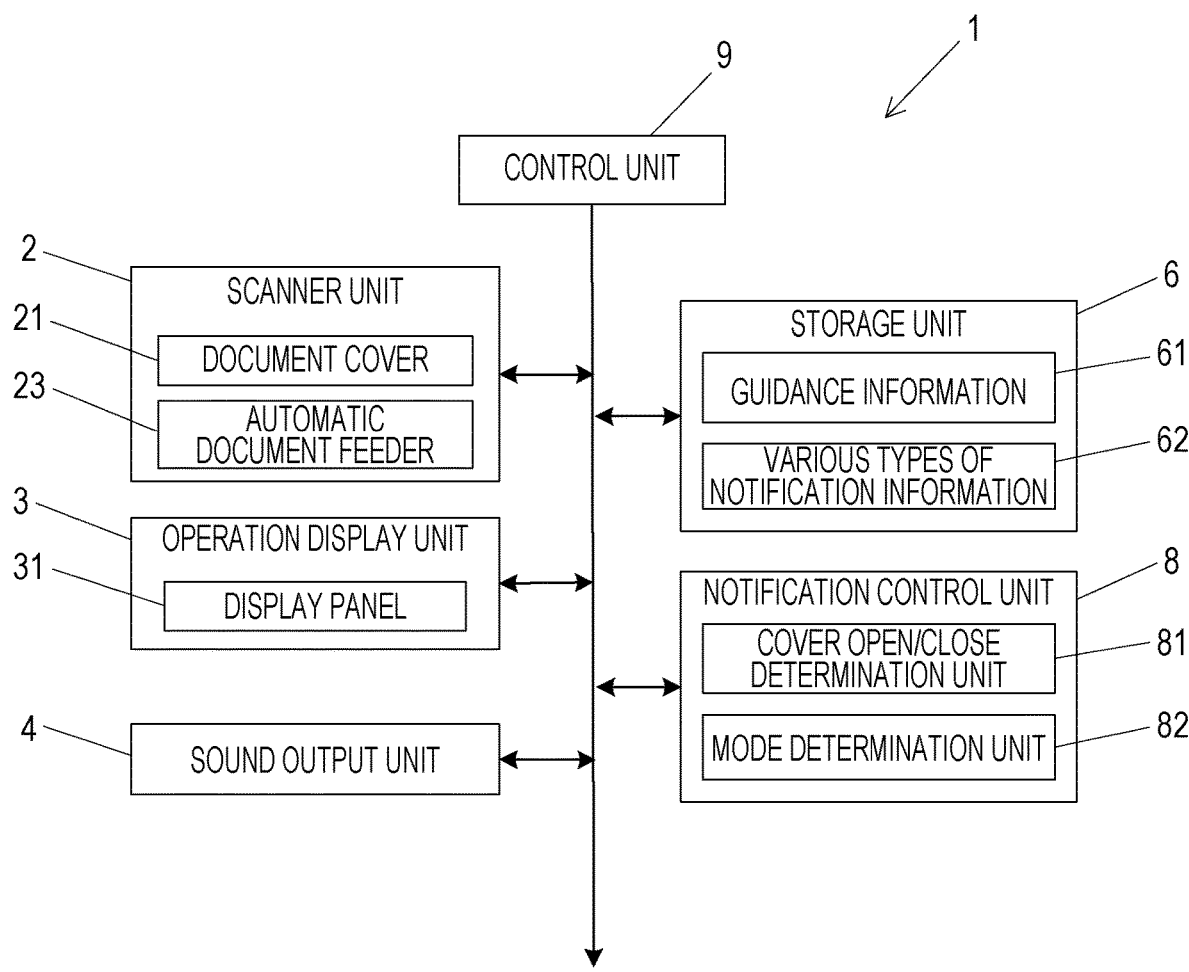
FIG. 2 is a block diagram showing a configuration of the document reading device.

FIG. 1 is an explanatory diagram showing an overall configuration of an image forming apparatus including a document reading device according to the first embodiment, which is an example of a mode for carrying out the present disclosure, and FIG. 2 is a block diagram showing a configuration of the document reading device.

As shown in FIG. 1, the first embodiment is directed to an image forming apparatus 100, including a document reading device 1 that is capable of selectively designating a document reading process, which is characterized in that appropriate guidance is performed for a user according to a document reading mode in performing a document reading operation with the document reading device 1.

First, an overall configuration of the image forming apparatus 100 according the first embodiment is described.

As shown in FIG. 1, the image forming apparatus 100 includes, as main components thereof, the document reading device 1, an operation display unit 3, an image forming unit 104, a paper feeding unit 106, and a paper ejection process device 108.

On the basis of image data inputted through the document reading device 1, a toner image is formed on a recording medium in the image forming unit 104. A sheet recording paper on which an image has been printed is guided toward a paper output tray 107 or the paper ejection process device 108 and either ejected into the paper output tray 107 or ejected into any of paper output trays 110 of the paper ejection process device 108.

As shown in FIG. 2, the document reading device 1 includes, as main components thereof, a scanner unit 2, the operation display unit 3, a sound output unit (notification unit) 4, a storage unit 6, a notification control unit 8, and a control unit 9.

In the first embodiment, the scanner unit 2 performs document reading and reads a document on which an image has been formed. In addition to a function of reading a document in a normal way, the scanner unit 2 includes a function (multiple cropping function) of reading a plurality of documents in a single reading operation, and is characterized by acquiring, for each of the documents, first document reading information obtained by reading the plurality of documents with a document cover (platen cover) 21 in an open state and second document reading information obtained by reading the plurality of documents with the document cover 21 in a closed state.

Further, the scanner unit 2 includes an automatic document feeder (ADF: Auto Document Feeder) 23 that is capable of continuously reading a plurality of documents. The automatic document feeder 23 is configured to function as the document cover 21.

The document reading device 1 includes a normal mode in which to read a document in a normal way and a crop mode based on the multiple cropping function.

The operation display unit 3 includes a display panel 31 and displays an operation screen for performing a document reading operation, a preview image that shows a state of reading of a document that has been read, a guidance display, and the like.

The sound output unit 4 gives sound notification of guidance or the like regarding the operation of the apparatus.

The storage unit 6 has stored therein guidance information 61 for performing guidance by means of sound, various types of notification information 62 regarding the apparatus, and the like. The various types of notification information 62 include not only sound information but also display information corresponding to various types of message.

The notification control unit 8 includes a cover open/close determination unit 81 and a mode determination unit 82 and, according to states of the apparatus and the device, exercises control so that the sound output unit 4 outputs (gives notification of) guidance or the like regarding the operation of the apparatus.

The cover open/close determination unit 81 determines whether the document cover 21 is in an open or closed state.

The mode determination unit 82 determines which document reading mode (normal mode, crop mode) a user has selected.

The control unit 9 controls the operation of each component of the document reading device 1 in accordance with an operation program for reading a document.

Reading of Document by Document Reading Device

The following describes an operation of reading of a document by the document reading device 1.

In the first embodiment, in a case of reading a document, the document reading device 1 reads the document with either the normal mode or the crop mode selected.

Normal Mode

First, in a case of reading one document at a time in the normal mode, the document reading device 1 reads the document with the document placed on the platen and with the document cover 21 in a closed state as shown in FIG. 1. In a case of continuously reading a plurality of documents in the normal mode, the document reading device 1 reads the documents with the automatic document feeder 23, which functions as the document cover 21, placed over the platen in a closed state and with the documents placed on the automatic document feeder 23 and sent out one by one.

Crop Mode

Next, in a case of reading documents in the crop mode, the document reading device 1 reads the documents with the documents, which are targets of reading, placed on the platen and with the document cover 21 in an open state. In this case, there is no reflection of scanning light. This results in a scan image with a black background that makes it possible to discriminate between the documents.

Classification of Patterns of Operation of Execution of Guidance by Document Reading Device The following describes an example in which whether guidance is executed by the document reading device 1 is determined according to a classification of patterns of operation.

FIG. 5 is an operation pattern classification table that classifies patterns of user operation in the first embodiment.

The following describes a process by which in a case of performing document reading with the crop function, the document reading device 1 determines, with reference to the operation pattern classification table of FIG. 5, whether to perform guidance, depending on states of operation that precede the turning on of the crop function (states of opening of the document cover 21) and operations that follow the turning on of the crop function.

As shown in FIG. 5, the first embodiment classifies patterns of operation of execution of guidance by the document reading device 1 into nine main patterns.

In pattern 1 (in which the states that precede the turning on of the crop function include a state where the document cover 21 is closed and a state where the presence or absence of a document is unknown and the operations that follow the turning on of the crop function include opening the document cover 21 immediately, placing a document, and keeping the document cover 21 open), the resulting determination renders job execution "enabled", and no guidance is executed.

In pattern 2 (in which the states that precede the turning on of the crop function include a state where the document cover 21 is closed and a state where the presence or absence of a document is unknown and the operations that follow the turning on of the crop function include opening the document cover 21 immediately, placing a document, and closing the document cover 21), the resulting determination renders job execution "disabled". This is obviously an operating error, so guidance is executed.

In pattern 3 (in which the states that precede the turning on of the crop function include a state where the document cover 21 is closed and a state where the presence or absence of a document is unknown and the operations that follow the turning on of the crop function include not opening the document cover 21 immediately), the resulting determination renders job execution "disabled". In this case, since there is a high possibility that a document has already been placed and there is a risk of an operating error, guidance is executed.

In pattern 4 (in which the states that precede the turning on of the crop function include a state where the document cover 21 is closed and a state where a document has already been detected and the operations that follow the turning on of the crop function include opening the document cover 21 immediately), the resulting determination renders job execution "enabled", and no guidance is executed.

In pattern 5 (in which the states that precede the turning on of the crop function include a state where the document cover 21 is closed and a state where a document has already been detected and the operations that follow the turning on of the crop function include not opening the document cover 21 immediately), the resulting determination renders job execution "disabled". Since there is a high possibility of an operating error, guidance is executed.

In pattern 6 (in which the states that precede the turning on of the crop function include a state where the document cover 21 is open and a state where a document has already been detected and the operations that follow the turning on of the crop function include keeping the document cover 21 open), the resulting determination renders job execution "enabled", and no guidance is executed.

In pattern 7 (in which the states that precede the turning on of the crop function include a state where the document cover 21 is open and a state where a document has already been detected and the operations that follow the turning on of the crop function include closing the document cover 21), the resulting determination renders job execution "disabled". This is obviously an operating error, so guidance is executed.

In pattern 8 (in which the states that precede the turning on of the crop function include a state where the document cover 21 is open and a state where a document has yet to be detected and the operations that follow the turning on of the crop function include placing a document and keeping the document cover 21 open), the resulting determination renders job execution "enabled", and no guidance is executed.

In pattern 9 (in which the states that precede the turning on of the crop function include a state where the document cover 21 is open and a state where a document has yet to be detected and the operations that follow the turning on of the crop function include placing a document and closing the document cover 21), the resulting determination renders job execution "disabled". This is obviously an operating error, so guidance is executed.

Thus, whether a document reading process is executable is determined with reference to the classification of patterns of operation, depending on states of the device and states of operation. In a case where the document reading process is executable, no guidance is performed, and in a case where the document reading process is inexecutable, guidance is performed.

Process Steps of Document Reading

The following describes, with reference to a flow chart, a process by which the document reading device 1 according to the first embodiment performs guidance according to a document reading mode.

Figure 3:
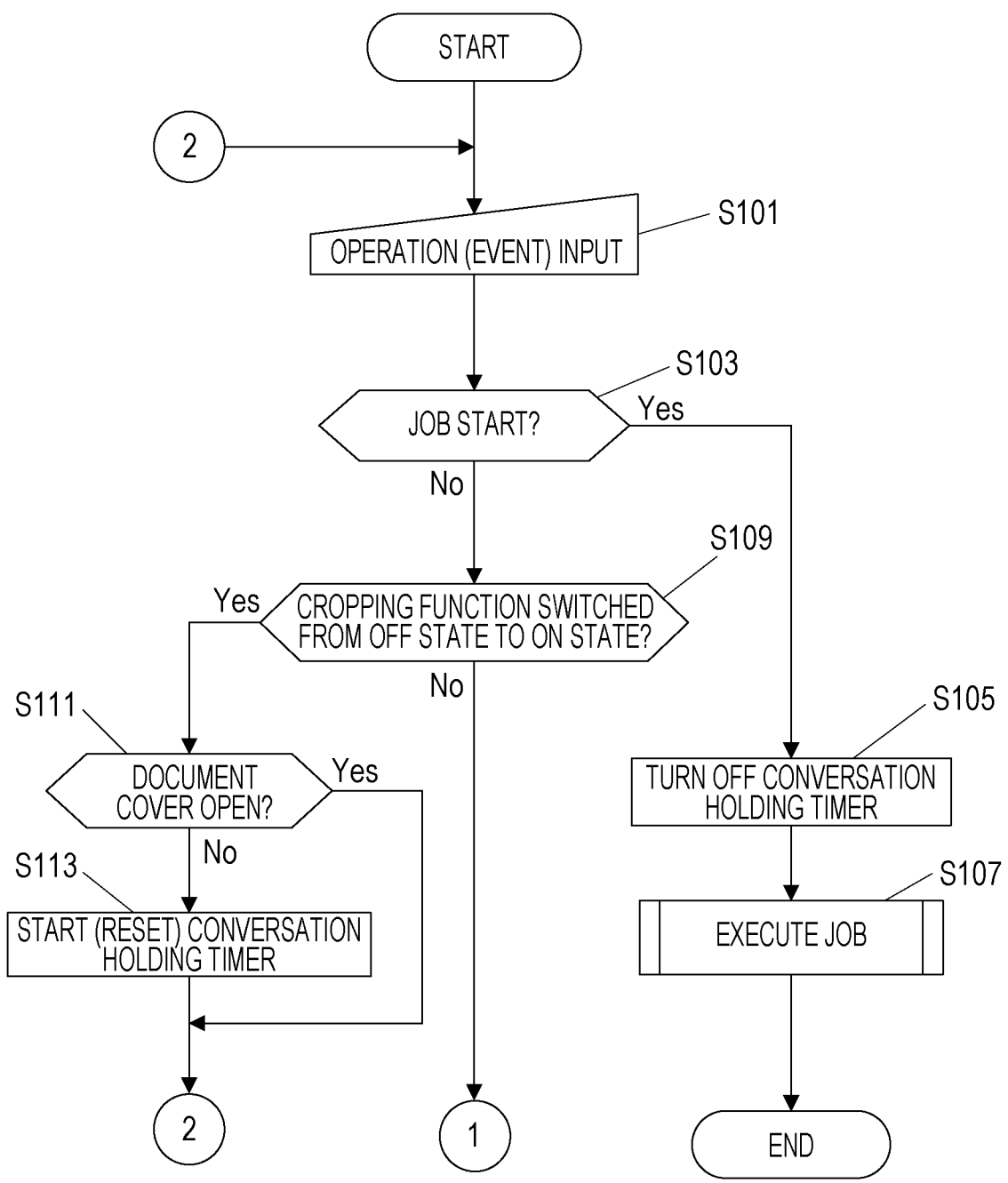
FIG. 3 is a flow chart showing an example of a process by which the document reading device performs guidance according to a document reading mode.
Figure 4:
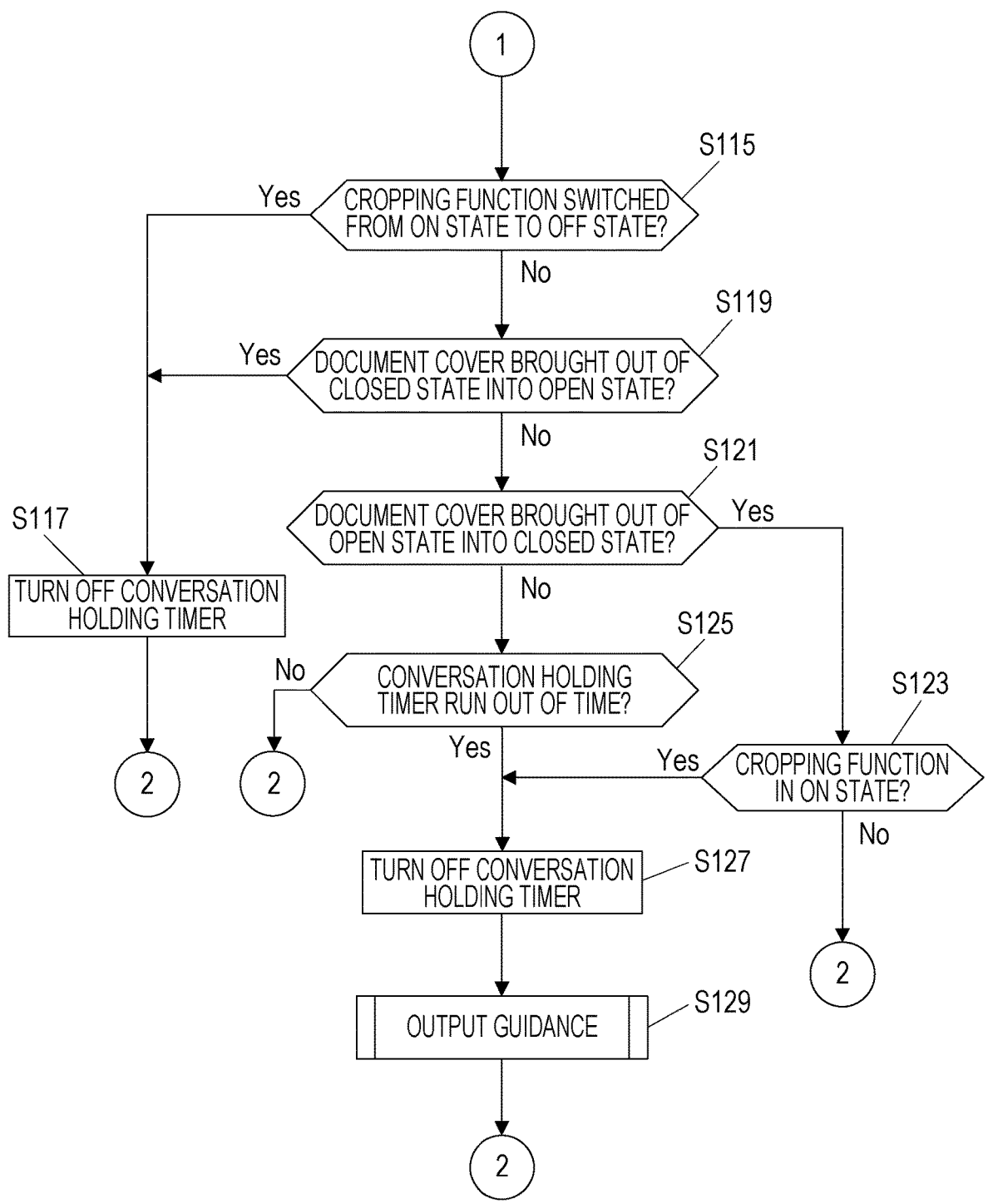
FIG. 4 is a flow chart that follows FIG. 3.

FIG. 3 is a flow chart showing an example of a process by which the document reading device according to the first embodiment performs guidance according to a document reading mode, and FIG. 4 is a flow chart that follows FIG. 3.

As shown in FIG. 3, once the document reading device 1 starts a document reading process (step S101), whether to start document reading (job start) is determined (step S103).

In a case where it has been determined in step S103 that document reading is started, a conversation holding timer is turned off (step S105). Next, a job of reading a document is executed (step S107). Then, the document reading process ends.

The first embodiment assumes here that the time of the conversation holding timer is set for three seconds. This time may be set for an appropriate length. Further, guidance for users is performed by sound conversations.

The conversation holding timer runs out of time in a case where the document cover 21 has not been opened within a predetermined period of time since it started counting, and a sound message is outputted. The conversation holding timer stops in a case where the crop function has been turned off, a case where the job has been executed, a case where the document cover 21 has been opened, or a case where time is up.

On the other hand, in a case where it has been determined in step S103 that document reading is not started, whether the crop function has been turned on is determined (step S109). Then, in a case where it has been determined that the crop function has not been turned on, whether the crop function has been switched from an on state to an off state is determined (step S115).

In a case where it has been determined in step S109 that the crop function has been turned on, whether the document cover 21 is open is determined (step S111). In a case where it has been determined that the document cover 21 is not open, the conversation holding timer is reset and started (step S113). The process returns to step S101, and the operation of the document reading process is performed again.

In a case where it has been determined in step S111 that the document cover 21 is open, the process returns directly to step S101, and the operation of the document reading process is performed again.

In a case where it has been determined in step S115 that the crop function has been switched from an on state to an off state, the conversation holding timer is turned off (step S117). The process returns to step S101, and the operation of the document reading process is performed again.

On the other hand, in a case where it has been determined in step S115 that the crop function has not been switched from an on state to an off state, whether the document cover 21 has been brought out of a closed state into an open state is determined (step S119).

In a case where it has been determined in step S119 that the document cover 21 has been brought out of a closed state into an open state, the conversation holding timer is turned off (step S117). The process returns to step S101, and the operation of the document reading process is performed again.

On the other hand, in a case where it has been determined in step S119 that the document cover 21 has not been brought out of a closed state into an open state, whether the document cover 21 has been brought out of an open state into a closed state is determined (step S121).

In a case where it has been determined in step S121 that the document cover 21 has been brought out of an open state into a closed state, whether the crop function is in an on state is determined (step S123).

In a case where it has been determined in step S123 that the crop function is not in an on state, the process returns to step S101, and the operation of document reading is performed again.

On the other hand, in a case where it has been determined in step S123 that the crop function is in an on state, the conversation holding timer is turned off (step S127), and guidance is outputted (step S129). Then, the process returns to step S101, and the document reading operation is performed again.

In a case where it has been determined in step S121 that the document cover 21 has not been brought out of an open state into a closed state, whether the conversation holding timer has run out of time is determined (step S125).

In a case where it has been determined in step S125 that the conversation holding timer has not run out of time, the process returns to step S101, and the operation of the document reading process is performed again.

On the other hand, in a case where it has been determined in step S125 that the conversation holding timer has run out of time, the conversation holding timer is turned off (step S127), and guidance is outputted (step S129). Then, the process returns to step S101, and the document reading operation is performed again.

In this way, once a document reading operation is started, whether to perform guidance is determined according to states of operation of the document reading device. In a case where no guidance is needed, no guidance is performed, and in a case where guidance is needed, guidance is executed at an optimal timing.

In the document reading device 1 according to the first embodiment thus configured, when a specific document reading process that functions under a specific device state has been selected, e.g. a document reading process has been selected by which document reading is performed with a multiple cropping function of starting document reading with the document cover 21 in an open state, control is exercised so that in a case where a device state of the document reading device 1 is a state where the document cover 21 is not open, guidance that prompts for bringing the document cover 21 into an open state is outputted from the sound output unit 4 after a predetermined period of time (three seconds) has elapsed since the multiple cropping function was selected and so that in a case where the device state of the document reading device 1 is a state where the document cover 21 is open, guidance whose content prompts for bringing the document cover 21 into an open state is not outputted. This makes it possible to execute highly useful guidance without a feeling of cumbersomeness in a user by performing appropriate guidance according to the status of an operation of performing document reading.

In the first embodiment, the sound output unit 4 is provided to output guidance by means of sound. However, this is not intended to limit notification of guidance. The display panel 31 may display guidance.

Second Embodiment

The following describes a second embodiment with reference to the drawings.

For convenience of explanation, components having the same functions as those of the first embodiment are given the same reference numerals and, as such, are not described below.

Figure 6:
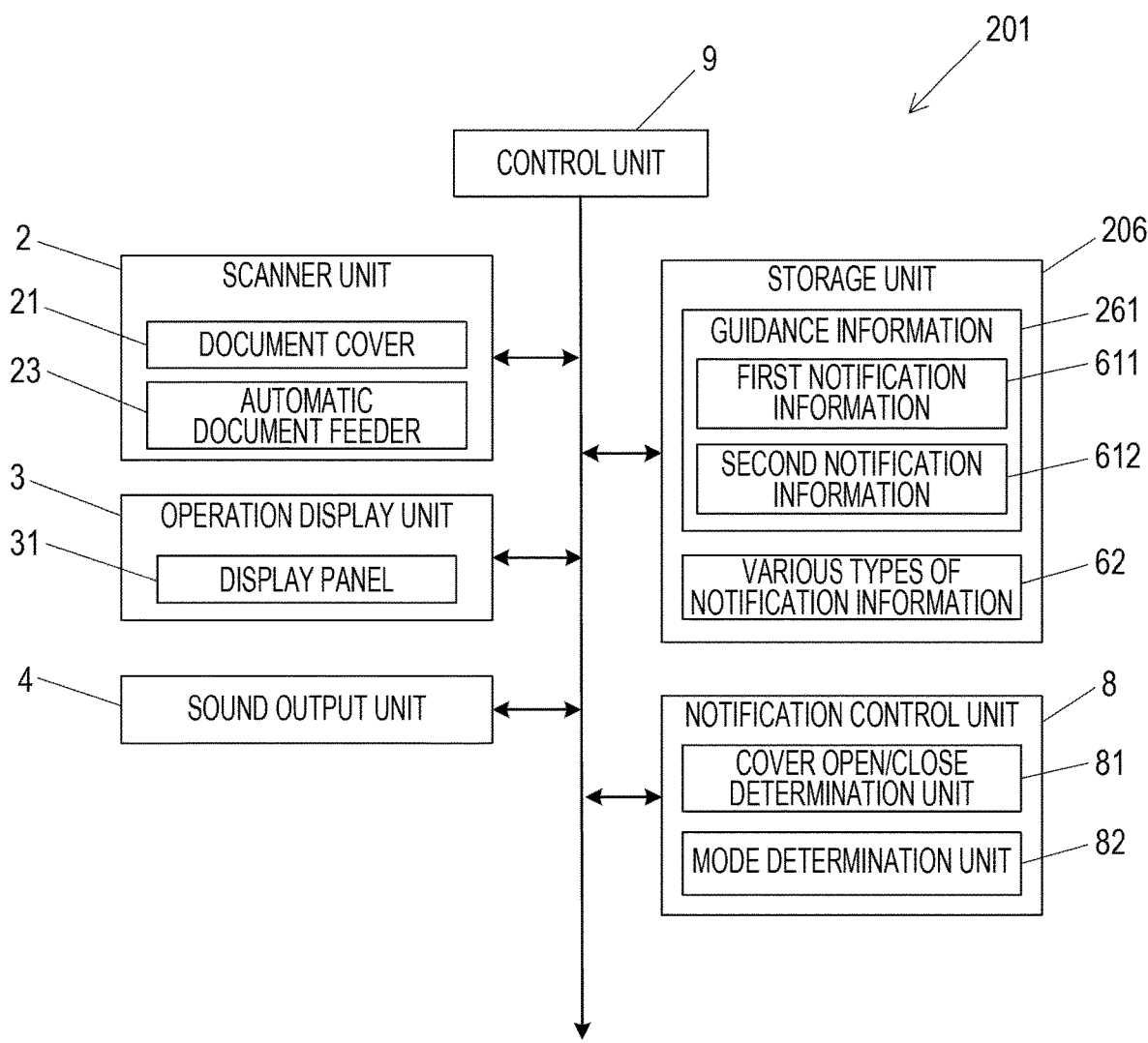
FIG. 6 is a block diagram showing a configuration of a document reading device according to a second embodiment.

FIG. 6 is a block diagram showing a configuration of a document reading device according to a second embodiment.

As shown in FIG. 6, a document reading device 201 according to the second embodiment is characterized in that appropriate guidance is performed for a user according to a document reading mode in performing a document reading operation with the document reading device 201 and in that the guidance is performed by varying modes of notification from step to step.

As shown in FIG. 6, the document reading device 201 includes, as main components thereof, a scanner unit 2, an operation display unit 3, a sound output unit 4, a storage unit 206, a notification control unit 8, and a control unit 9.

In the second embodiment, the storage unit 206 has stored therein guidance information 261 for performing guidance by means of sound, various types of notification information 62 regarding the apparatus, and the like.

The guidance information 261 includes, as notification information, first notification information 611 and second notification information 612.

The first notification information 611 is notification information by which notification of elapse of a predetermined period of time is given after the predetermined period of time has elapsed since a specific document reading process was selected.

The second notification information 612 is notification information that, after the notification given by the first notification information 611, prompts for bringing the document cover 21 into an open state in a case of performing document reading with the document reading device 201 in a specific device state, e.g. with the crop function.

In the document reading device 201 according to the second embodiment thus configured makes it possible to, without suddenly executing guidance in a case of performing the guidance, give notification of the first notification information first to notify a user that the guidance is performed and then give notification of the second notification information to prompt for a proper operation without causing a feeling of cumbersomeness in the user.

Third Embodiment

The following describes a third embodiment with reference to the drawings.

For convenience of explanation, components having the same functions as those of the first embodiment are given the same reference numerals and, as such, are not described below.

Figure 7:
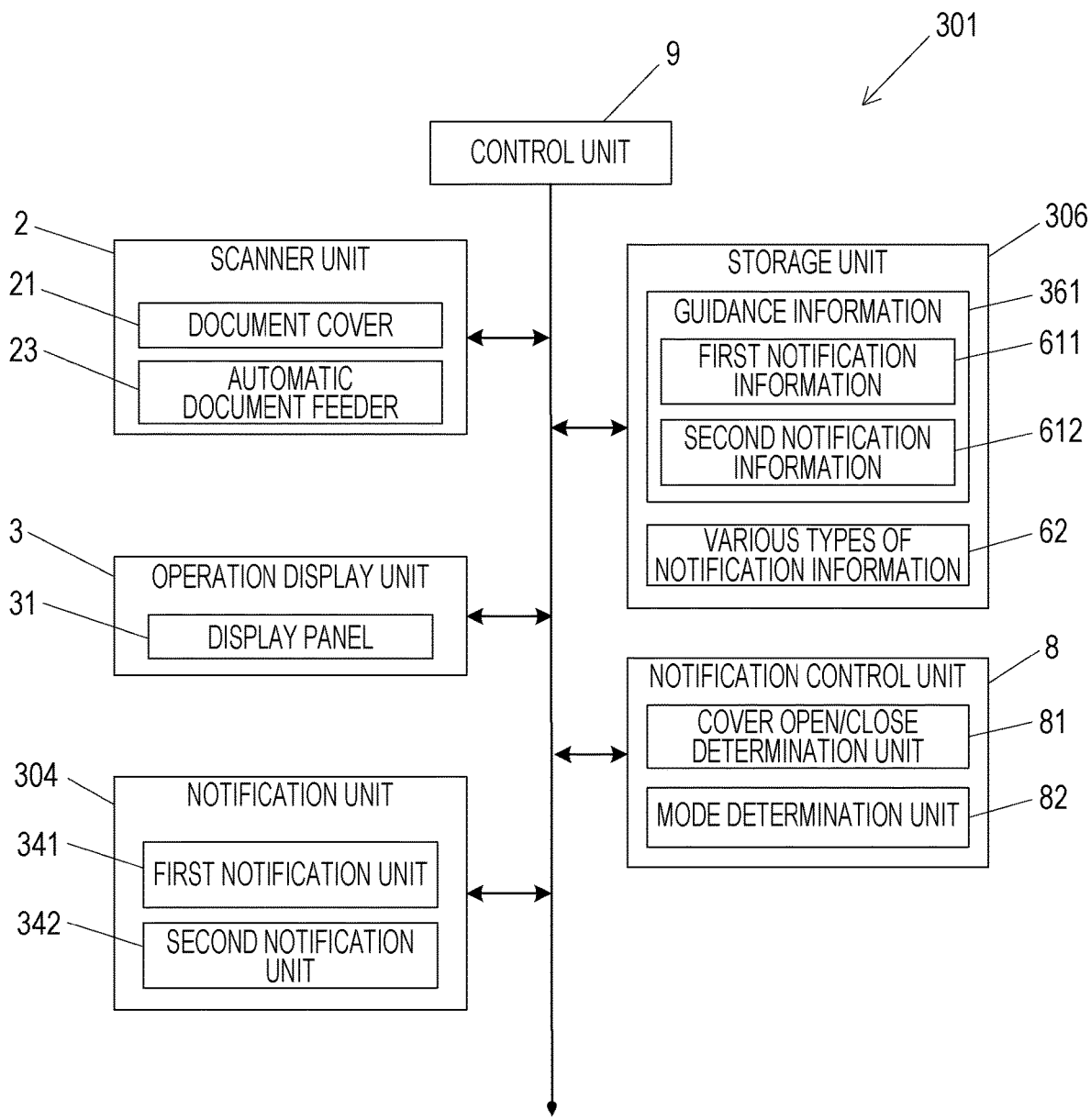
FIG. 7 is a block diagram showing a configuration of a document reading device according to a third embodiment.

FIG. 7 is a block diagram showing a configuration of a document reading device according to a third embodiment.

As shown in FIG. 7, a document reading device 301 according to the third embodiment is characterized in that appropriate guidance is performed for a user according to a document reading mode in performing a document reading operation with the document reading device 301 and in that different notification units make notification of the guidance by varying modes of notification from step to step.

As shown in FIG. 7, the document reading device 301 includes, as main components thereof, a scanner unit 2, an operation display unit 3, a notification unit 304, a storage unit 306, a notification control unit 8, and a control unit 9.

In the third embodiment, the storage unit 306 has stored therein guidance information 361 for performing guidance by means of sound, various types of notification information 62 regarding the apparatus, and the like.

The guidance information 361 includes, as notification information, first notification information 611 and second notification information 612.

The first notification information 611 is notification information by which notification of elapse of a predetermined period of time is given after the predetermined period of time has elapsed since a specific document reading process was selected.

The second notification information 612 is notification information that, after the notification given by the first notification information 611, prompts for bringing the document cover 21 into an open state in a case of performing document reading with the document reading device 301 in a specific device state, e.g. with the crop function.

Further, in the third embodiment, the notification unit 304 includes a first notification unit 341 that gives notification of the first notification information 611 and a second notification unit 342 that gives notification of the second notification information 612.

The first notification unit 341 may produce sound through a sound output unit 4 of the apparatus. Further, the display panel 31 may display a message. Furthermore, a light may be separately provided to emit light.

The second notification unit 342 may produce sound through the sound output unit 4. Further, the display panel 31 may display a message.

In the document reading device 301 according to the third embodiment thus configured makes it possible to, without suddenly executing guidance in a case of performing the guidance, give notification of the first notification information through the first notification unit 341 first to notify a user that the guidance is performed and then give notification of the second notification information through the second notification unit 342 to prompt for a proper operation without causing a feeling of cumbersomeness in the user.

In each of the embodiments described above, the guidance information and the various types of notification information are stored in advance in the storage unit 6 or the like of the apparatus. However, this is not intended to impose any limitation. The guidance information and the like may be acquired from an external file system, server, or service. Further, the guidance information and the like may be acquired from outside at such a timing as to be either acquired in real time or downloaded in advance and stored in the apparatus.

Further, as for the settings for control that executes guidance, for example, the setting of a predetermined period of time or the like during which to hold notification may be changed by an administrator or a user.

Further, the setting of a predetermined period of time or the like during which to hold notification may be automatically changed by the document reading device for each user or depending on usage.

Further, in each of the embodiments described above, notification of the guidance information is outputted to the sound output unit 4, the display panel 31, or the like of a device/apparatus body of the document reading device or the image forming apparatus. However, this is not intended to impose any limitation. For example, notification of the guidance information may be outputted to a screen of an external device such as a smartphone or a smart speaker or an external device such as a lamp, and such an external device may be connected by wire or by radio.

Furthermore, in each of the embodiments described above, the document reading device detects and determines its own device state to give notification of guidance. However, external control software may acquire the state of the document reading device to control the content of notification and the timing of notification.

For example, the present control method is also applicable to a configuration in which a UI of an MFP (multifunction peripheral such as a multifunction printer) is controlled by an external application, a configuration in which a connection is made from a terminal such as a so-called smartphone to a web application and control is exercised from the side of the web application, and a configuration in which an operation is performed from an MFP operation application installed in the terminal.

As noted above, the present disclosure is not limited to the embodiments described above but may be altered in various ways within the scope of the claims. It is obvious to those skilled in the art that various alternations or modification may be made within the scope of the claims, and an embodiment based on a combination of technical means altered as appropriate without departing from the spirit of the present disclosure is encompassed in the technical scope of the present disclosure.

The present disclosure contains subject matter related to that disclosed in Japanese Priority Patent Application JP 2018-096305 filed in the Japan Patent Office on May 18, 2018, the entire contents of which are hereby incorporated by reference.

What is claimed is:

1. A document reading device that is capable of selectively designating a document reading process, the document reading device comprising:
a display panel that notifies a user of information needed for a document reading process that has been selected, by using display;
a sound notifier that notifies a user of information needed for a document reading process that has been selected, by using sound; and
a controller that controls output from the display panel and the sound notifier,
wherein when a specific document reading process that functions under a specific device state has been selected, the controller exercises control so that in a case where a device state of the document reading device is not the specific device state, the information that prompts for the specific device state is outputted by at least one of the display panel and the sound notifier after a predetermined period of time has elapsed since the specific document reading process was selected and so that in a case where the device state of the document reading device is the specific device state, the information that prompts for the specific device state is not outputted by the display panel and the sound notifier, and
the information is a guidance that is outputted due to a selection of the specific document reading process.

2. The document reading device according to claim 1, wherein in a case where the specific document reading process has been selected and the specific device state exists, the controller causes the at least one of the display panel and the sound notifier to output the information immediately in a case where the specific device state has ceased to exist.

3. The document reading device according to claim 1, wherein the information is display information that is displayed on the display panel.

4. The document reading device according to claim 1, wherein
the information is sound information that is outputted by the sound notifier.

5. The document reading device according to claim 1, wherein notification of the information is made by varying modes of notification from step to step.

6. The document reading device according to claim 1, wherein the information includes
first information by which notification of elapse of a predetermined period is given after the predetermined period of time has elapsed since the specific document reading process was selected, and
second information that, after the notification given by the first information, prompts for the specific device state.

7. The document reading device according to claim 1, further comprising:
a platen on which a document is placed; and
a platen cover or an automatic document feeder openably and closably installed over the platen,
wherein the specific device state is a state where the platen cover or the automatic document feeder is in an open state or a closed state.

8. The document reading device according to claim 1, wherein output from the display panel and the sound notifier are destined for a device or a service externally connected to the document reading device.

9. An image forming apparatus, including a document reading device that is capable of selectively designating a document reading device, which is capable of forming an image, the image forming apparatus comprising, as the document reading device, the document reading device according to claim 1.

10. A method for notifying of guidance about a document reading device that is capable of selectively designating a document reading process,
the document reading device comprising:
a display panel that notifies a user of information needed for a document reading process that has been selected, by using display; and
a sound notifier that notifies a user of information needed for a document reading process that has been selected by using sound,
the method comprising:
controlling the notification of the information; and
when a specific document reading process that functions under a specific device state has been selected, exercising control so that in a case where a device state of the document reading device is not the specific device state, notification of the information that prompts for the specific device state is given by at least one of the display panel and the sound notifier after a predetermined period of time has elapsed since the specific document reading process was selected and so that in a case where the device state of the document reading device is the specific device state, notification of the information whose content prompts for the specific device state is not given by the display panel and the sound notifier,
wherein the information is a guidance that is outputted due to the specific document reading process has been selected.

11. The method according to claim 10, wherein the information includes
first information by which notification of elapse of a predetermined period is given after the predetermined period of time has elapsed since the specific document reading process was selected, and
second information that, after the notification given by the first information, prompts for the specific device state.

12. A document reading device that is capable of selectively designating a document reading process, the document reading device comprising:
a display panel that notifies a user of information needed for a document reading process that has been selected, by using display;
a sound notifier that notifies a user of information needed for a document reading process that has been selected, by using sound; and
a controller that controls output from the display panel and the sound notifier,
wherein when a specific document reading process that functions under a specific device state has been selected, the controller exercises control so that in a case where a device state of the document reading device is not the specific device state, the information that prompts for the specific device state is outputted by at least one of the display panel and the sound notifier after a predetermined period of time has elapsed since the specific document reading process was selected and so that in a case where the device state of the document reading device is the specific device state, the information that prompts for the specific device state is not outputted by the display panel and the sound notifier, and wherein the information includes first information by which notification of elapse of a predetermined period is given after the predetermined period of time has elapsed since the specific document reading process was selected, and second information that, after the notification given by the first information, prompts for the specific device state.

\* \* \* \* \*